Patented Jan. 5, 1926.

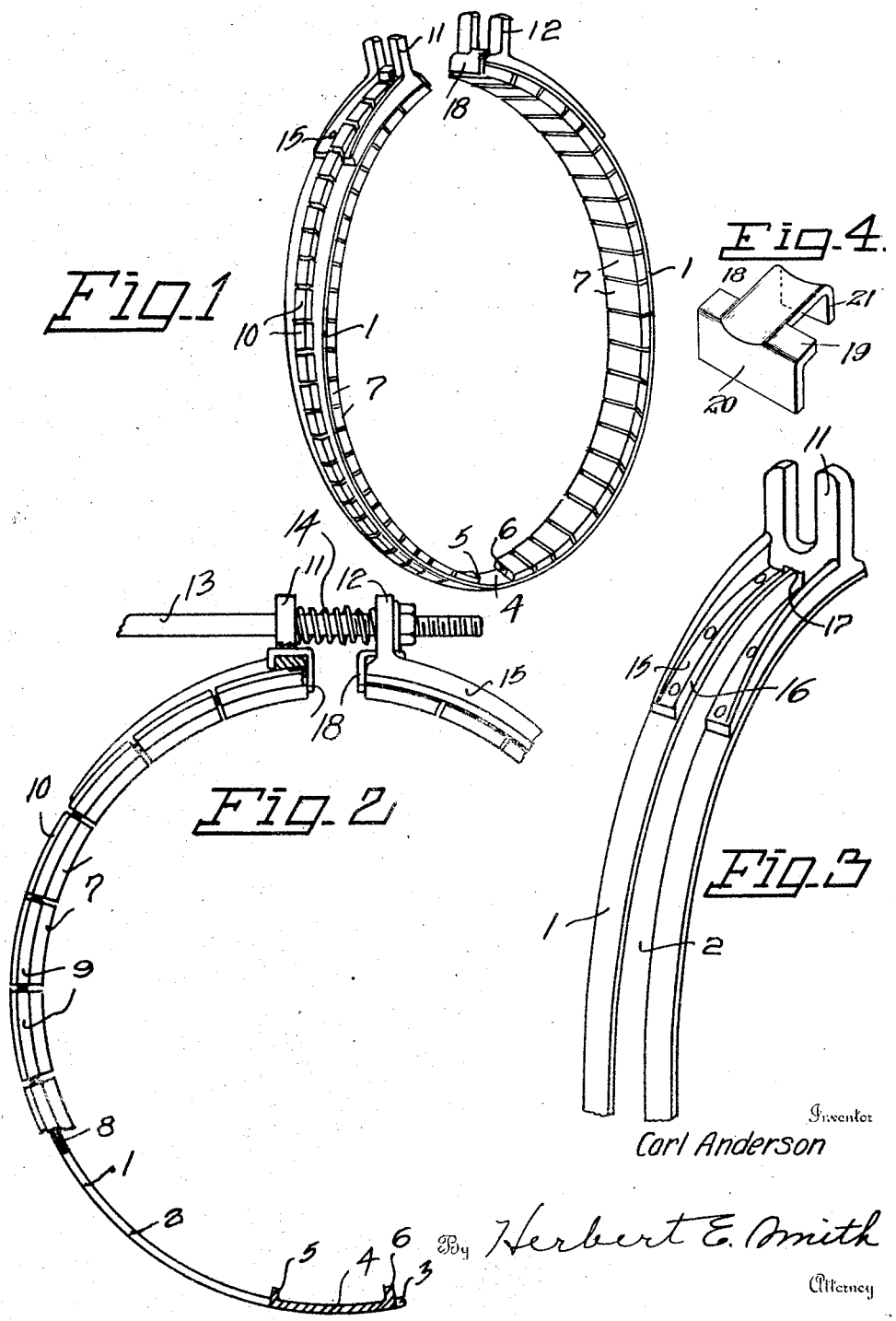

1,568,043

UNITED STATES PATENT OFFICE.

CARL ANDERSON, OF ROZA, WASHINGTON, ASSIGNOR OF ONE-HALF TO THOMAS C. DOOLITTLE, OF ROZA, WASHINGTON.

BRAKE BAND.

Application filed December 12, 1924. Serial No. 755,437.

*To all whom it may concern:*

Be it known that I, CARL ANDERSON, a citizen of the United States, residing at Roza, in Kittitas County and State of Washington, have invented certain new and useful Improvements in Brake Bands, of which the following is a specification.

My present invention relates to improvements in brake bands and especially to that form of brake band employed in the Ford type of automobiles in which the brake or clutch disk or drum rotates within a circular split resilient band of metal that may be clamped upon the periphery of the disk or drum to insure frictional resistance to the rotation of the disk.

As is well known to those familiar with devices of this character, extreme difficulty is encountered in assembling or replacing the bands, or linings of the bands, while the parts are enclosed within the transmission case or housing. The primary object of my invention is the provision of a device including the band and lining and involving features of construction whereby when the cover plate of the transmission housing is removed and the foot levers or pedals disconnected, the brake bands may readily be withdrawn, or the liners or linings may with facility and convenience be withdrawn from the bands. The bands or liners may then be replaced and locked into position with equal facility and convenience.

The invention consists in certain novel combinations and arrangements of parts for accomplishing these purposes as will hereinafter be more fully set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a perspective view of a brake band involving the principles of my invention.

Figure 2 is an enlarged view of a portion of the band showing the connected ends thereof, and the fastening or locking means for the friction blocks of the lining members.

Figure 3 is a perspective view of a portion of a band showing the end construction from the exterior.

Figure 4 is a perspective view of one of the locking keys for retaining the friction blocks of the lining in place.

The band 1 is preferably made from a strip of flexible and resilient metal and fashioned with a pair of circumferentially extending slots 2 and 3 which slots open at the adjoining ends of the split ring or band and extend therefrom toward the center of the band where they terminate in a solid portion 4 the full width of the band and midway the length of the band. At the two adjoining terminals of these slots inwardly projecting, integral spurs or lugs 5 and 6 are struck from the material of the band at the time the slots are being fashioned with suitable tools or machinery.

At its inner side the metal band is lined with blocks 7 made up of suitable material and fashioned with curved friction faces for engagement with the periphery of the disk or drum with which they co-act. The blocks are substantially the same width as the band and are arranged in two series thereon extending around the circular band as indicated in Figure 1. These liner blocks are each perforated longitudinally and they are strung or laced together in the two series by means of flexible wires, cords or cables as indicated at 8. The wires pass through the succeeding perforated blocks to retain them in close association and to form a flexible liner for the band. Each block is fashioned with a pair of lateral grooves 9 extending longitudinally thereof, and a head 10, the former slidably engaged with the walls of the slots in the band, and the latter designed to slide or rest upon the outer face of the band and overlap the side walls of the slots. By this construction the blocks provide an effective friction lining for the band which lining is retained in position by the heads or tongues thereon in engagement with the slotted band. The two series or "strings" of liners are slid respectively from the split ends of the circular band through the open end slots of the band and toward the central portion 4 where the foremost block of each string or series is forced against the abutments as 5 and 6, and of course the length of the "string" corresponds with the arcuate length of the slotted band.

The adjoining ends of the brake band are provided with the usual notched lugs 11 and 12 for the brake rod 13, and the usual spring 14 is interposed between the notched lugs as in Figure 2 to normally retain the lugs in spaced position.

These lugs which may be drop forgings or fashioned in other suitable manner, are each provided with a base flange 15 riveted at the exterior face of the band, and the flanges have slots 16 complementary to the slots of the band in order that the slots may afford a clear space for assembling the liners or linings. The notched lugs 11 and 12 also have under grooves 17 therein forming extensions of these slots for ready passage of the heads or tongues 10 of the friction blocks in assembling or withdrawing the linings.

After the two "strings" or connected blocks have been slid into position with the foremost block against the abutments 5 and 6, each string or series is locked in operative position by means of a key 18 which is preferably fashioned from somewhat resilient metal, and one of which keys is illustrated in Figure 4. Each key comprises a plate 19 having an angular retaining flange 20 and a hook 21. As best seen in Figure 2 where parts are broken away for convenience of illustration, the hook 21 is slipped over and forced down into engagement with the base of the notched lug, and the retaining flange 20 of the key engages against the exposed end of an end block of each series or string of blocks. These locking keys are readily placed in position after the strings of liners have been slid to position and they then retain the strings of blocks in operative relation for frictional contact with the periphery of the drum or disk with which they are designed to co-act. When the necessity for replacement arises, these locking keys may be disengaged from their locked position by use of a proper tool to permit withdrawal of the strings of liner blocks which are slid along the slotted band and removed therefrom, after the ends of the band have been properly disconnected. After a new "string" of liner blocks has been substituted by sliding along the slotted band the keys are replaced, for further use of the band.

Having thus fully described my invention what I claim as new and desire to secure by Letters Patent is—

1. The combination with a brake band, a notched lug and a removable flexible lining carried by the band, of a removable locking key adapted to frictionally engage the notched lug, and retaining means on said key for engagement with said lining.

2. The combination with a brake band, a notched lug, and a removable flexible lining carried by the band, of a removable locking key comprising a hook adapted to frictionally engage the notched lug and a retaining flange for engagement with said lining.

3. The combination with a split brake band having a pair of spaced circumferentially extending slots, and two strings of friction blocks carried in said band, of notched lugs on the adjoining ends of said band, removable locking means frictionally engaging said notched lugs, and retaining devices on said locking means for engaging said strings of blocks.

4. The combination with a split brake band having a pair of slots and spaced notched lugs, of two strings of friction blocks carried in the slots of said band, and a removable locking key for each string comprising a hook adapted to frictionally engage a notched lug and a retaining flange integral with said hook for engaging an end of a string of blocks.

In testimony whereof I affix my signature.

CARL ANDERSON.